Patented July 21, 1931

1,815,615

UNITED STATES PATENT OFFICE

CARLETON ELLIS, OF MONTCLAIR, NEW JERSEY, ASSIGNOR TO ELLIS-FOSTER COMPANY, A CORPORATION OF NEW JERSEY

SULPHURED COMPOSITION ADAPTED AS A BINDER FOR HOOD CAPS AND FOR OTHER PURPOSES

No Drawing. Application filed November 5, 1925. Serial No. 67,173.

This invention relates to a sulphured composition adapted for various uses, for example, as a binder in plastic compositions, also for a like purpose in hood caps intended as bottle seals or covers, as a coating composition, floor wax, polishing material, and the like; and relates especially to compositions containing waxes, resins, and the like, as a major constituent, and sulphur as a minor constituent. In fact, it is an object in most cases to use only a very small proportion of sulphur, the incorporation of such small proportion, for example, sometimes less than one per cent of the weight of the total composition, yielding a product, the color of which is substantially lighter than that of the major constituents, and the texture of which is frequently improved in quality; all by the addition of this seemingly insignificant proportion of sulphur, or substances generating sulphur.

As a major constituent or component of the composition I prefer to employ various solid substances, such as the waxes, and particularly the animal and vegetable waxes, such as beeswax, shellac wax, carnauba wax, candelilla wax, Japan wax, and so forth. The utilization of various fats and fatty compositions, stearines, solid glycerides, and the like, as the major constituents, or in admixture with the foregoing waxes or other solid materials is sometimes feasible and desirable.

A preferred form of the invention involves the admixture with hard waxes, such as the foregoing, of a quantity of a resinous material and a small proportion of sulphur. In this case, as in the case of preparation of other compositions within the scope of the invention, I prefer to secure the intimate admixture required by fusing the ingredients together. After melting, the composition is well stirred and allowed to cool.

However, other steps of mixing are not precluded, as for example, melting the major constituent or constituents and adding the minor constituent, sulphur; or vice versa.

Again the vapors of sulphur or sublimate of sulphur, may be passed into the molten mass of solids constituting the major proportion of the composition. Thus, for example, I may take a cheap grade of carnauba wax which has a dark brown or greenish tone, and on melting with one per cent or so, by weight, of sulphur, mixing thoroughly and cooling, a composition is obtained which is of a much lighter color, corresponding to the more costly high grade carnauba wax. The texture of the product, in my opinion, is somewhat improved, as it seems to acquire a finer grain than the original wax. This improved texture tends to make more wax more desirable in certain applications.

A composition illustrative of my invention, that is, a fused material—meaning thereby a solid product which has been made by a fusion method, or a product in a molten condition—may be made as follows:—

80 parts of dark colored carnauba wax, 20 parts of ordinary rosin, and 2 parts of sulphur, are melted together at a temperature between 120–125° C., with stirring, for a period of about five minutes, then the mixture is allowed to cool. On comparing this composition with that made from 80 parts of wax, and 20 parts of rosin, without any sulphur, it will be observed that the latter is dark in color and slightly translucent, with a decided waxy appearance, whereas the composition containing the sulphur is light in color, opaque and of a less waxy appearance.

A composition may be made from an artificially modified resin, for example, rosin ester, or ester gum, in a similar manner, and the lightening in color resulting on the incorporation of the sulphur, is as a rule, even more pronounced.

Other resins, such as copal, cumaron, damar, and the like, may be incorporated with wax and sulphur in the foregoing, or any other appropriate manner.

Mineral waxes, paraffines and ceresin are not so well adapted for treatment with sulphur to produce compositions of improved color and texture, as noted above, and the effect is far more pronounced with the animal and vegetable waxes and other components aforesaid, which form the major constituents of the composition prepared in accordance with my invention.

The temperature in heating to make the fused material, preferably is kept below 150° C. At temperatures in this neighborhood, and higher, there is danger of reaction of the sulphur with the formation of discolored composition. By keeping the temperature below 145° C., and preferably below 125° C., more satisfactory results are obtained. It may be desirable to maintain the temperature below that of the melting point of sulphur, and in such cases the wax or other ingredients may be melted at a temperature below 120° C., and molten sulphur added thereto with vigorous stirring. Sulphur dissolved in carbon bisulphide, or other solvent, likewise may be added, and the solvent removed by distillation.

If the foregoing waxes and resins are heated at moderate temperatures with sulphur in large proportion, separation into two layers occurs, with the sulphur forming the major portion of the lower layer. I prefer not to use any such proportion of sulphur that separation into two layers results. In the present invention it is an object to add only that amount of sulphur which will be taken up by the wax and other major constituents, so that separation is prevented. This does not mean that it is necessary to add sulphur just to the saturation point, as intermediate degrees of concentration oftentimes suffice. The preferred embodiment of the present invention, however, is concerned especially with a composition which is substantially saturated with sulphur without an excess which would separate on melting. By using sulphur to bring about such a substantial degree of saturation, that is, a few per cent only, a composition of desirable light color is simply obtained.

In the preferred embodiment, it is the practice to employ, in the case of wax of the type of carnauba wax, or mixtures of resins therewith, a very limited amount of sulphur, to avoid the formation in the product, as it cools, of discrete masses or nodules and visible crystals of sulphur, or material, the major proportion of which is sulphur. For example, when three per cent, by weight, of sulphur, is melted with carnauba wax, on cooling quickly, yellow masses of sulphur will be seen here and there throughout the composition. These small yellow masses injure the appearance of the composition and since they cannot be readily separated by mechanical means, they are objectionable. On the other hand, by using from one to two per cent of sulphur with this wax no separation visible to the naked eye occurs, but only the lightening in color and slight modification of texture. It is possible that a considerable proportion of the sulphur present in the cooled mass is in a dispersed state.

While I have mentioned carnauba wax particularly, it is to be understood that I may use other waxes, preferably those of high melting point. Thus, for example, candelilla wax, or beeswax, may be substituted for the carnauba wax in the foregoing formulas. The proportion of resin, when the latter is employed, may be varied with respect to the wax. For example, ten to twenty per cent of resin may be used on the one hand, or the wax may be used in this proportion with the resin predominating.

Finally, it may be noted that when, for example, carnauba wax is treated with one-tenth of one per cent to one-half of one per cent of sulphur, lightening in color does not take place. In fact, from a practical standpoint, an amount of sulpur approximately at least one per cent should be used to secure a composition of the requisite light color, while on the other hand, the sulphur preferably should not exceed approximately two per cent, in order to avoid the separation of visible particles, nodules, crystals, fragments, or layers of free sulphur, or this element with some slight contamination of one kind or another. I seek to obtain a product which to the naked eye is of homogeneous appearance.

What I claim is:—

1. A composition comprising about four parts of carnauba wax to one part, by weight, of rosin fused with a small amount of sulphur.

2. A fused composition comprising wax and rosin, and saturated with sulphur.

3. A fused composition comprising wax and resin, saturated with sulphur, but having no sulphur separating as discrete masses and nodules.

4. A composition comprising about four parts of carnauba wax to one part of rosin, saturated with sulphur; whereby lightening in color occurs, but being free from any visible particles of sulphur.

5. A fused composition containing wax, resin, and sulphur; the proportion of the latter being approximately not in excess of two per cent, nor less than one per cent by weight.

6. A composition containing sulphur-blanched wax of the group consisting of animal and vegetable waxes and resin.

7. A composition containing sulphur-blanched carnauba wax and rosin.

8. A composition containing wax and resin fused with sulphur at a temperature below that at which substantial chemical combination of the sulphur takes place.

9. A composition containing carnauba wax and rosin fused with sulphur at a temperature below 150° C.

10. A sulphur composition comprising a wax of the group consisting of animal and vegetable waxes and resin incorporated with a few percent of sulphur.

11. A composition comprising a non-montanic acid containing wax and resin incorporated with a few percent of sulphur.

12. A composition comprising wax and resin incorporated with a few percent of chemically uncombined sulphur.

13. A process which comprises fusing a wax and resin with sulphur at a temperature below that at which substantial chemical combination of the sulphur takes place.

14. A process which comprises fusing carnauba wax and rosin with sulphur at a temperature below 150° C.

15. A composition containing sulphur-blanched wax of the group consisting of animal and vegetable waxes, sulphur, and resin.

16. A composition containing sulphur-blanched carnauba wax, sulphur and rosin.

17. A composition containing sulphur-blanched wax of the group consisting of animal and vegetable waxes, sulphur and rosin ester.

18. A composition containing wax and resin fused with sulphur at a temperature below that at which substantial discoloration takes place.

CARLETON ELLIS.